United States

Hansen

4,122,059

Oct. 24, 1978

[54] REFRACTORY COMPOSITIONS

[75] Inventor: Lars J. Hansen, Clayton, Del.

[73] Assignee: World Chemical Industry, Inc., Wilmington, Del.

[21] Appl. No.: 665,561

[22] Filed: Mar. 10, 1976

[51] Int. Cl.$^2$ .............................................. C08L 63/02
[52] U.S. Cl. ......................... 260/37 EP; 106/15 FP; 106/85; 106/90; 106/104; 260/37 N; 260/40 R; 260/42.13
[58] Field of Search ........ 260/37 EP, 40 R, DIG. 24; 106/15 FP, 89, 90, 97, 99, 101, 85, 102, 105, 314, 315; 252/8.1

[56] References Cited

U.S. PATENT DOCUMENTS

| 931,884 | 8/1909 | McCormick | 106/89 |
|---|---|---|---|
| 2,307,270 | 1/1943 | Hodge | 106/89 |
| 3,782,991 | 1/1974 | Burge | 106/89 |
| 3,972,723 | 8/1976 | Balle et al. | 106/97 |

*Primary Examiner*—Lewis T. Jacobs
*Attorney, Agent, or Firm*—C. W. Mortenson

[57] ABSTRACT

Compositions of matter are provided by the invention herein which compositions may be in liquid or solid forms depending upon their projected uses, all of which provide fire retardancy in said uses which generally involve shaped articles such as coatings or moldings. The fire retardancy objective is accomplished by locking water into or available to the shaped article by the provision of an inorganic salt hydrate, such as aluminum sulfate hydrate or ferrous sulfate hydrate and by providing also a hydraulic cement, such as Portland cement. The powdered mixture of the salt hydrate and cement may also preferentially contain an alumina silica material which preferably is in fibrous form having fibers in it that have lengths of about 0.25 to about 2.0 inch. Also present in said powder may be an iron oxide and a manganese oxide, such as ferric oxide and manganous oxide, respectively. In certain instances graphite is incorporated into the mixtures, as in the case when epoxy polymers are used. It is preferred that the graphite be in fibrous form (0.25 to 0.5 inch), and while it can be used in amounts of about 1% to about 10%, the amount of 5% by weight is generally preferred.

While the powders may be applied as a coating to a surface of many substrates, the greatest resistance to fire is effected by uniformly distributing said mixtures of this invention into the material from which the shaped article is to be prepared and then shaping said article. The powders when exposed to flame or heat convert to refractory substances. Water from the hydrate is driven off into contact with the cement with the resultant setting of the cement and the production of refractory substances which make the shaped articles non-combustible and self-extinguishing. An outstanding advantage of the compositions of this invention is their ability to eliminate or very extensively reduce the production of smoke by the shape articles on their exposure to flame.

20 Claims, No Drawings

REFRACTORY COMPOSITIONS

BACKGROUND OF THE INVENTION

The need for fire-resistant materials is ever increasing. Industry's demands for such materials grow not only because of the increasing number of outlets for products that are exposed in their use to possibilities of fire but because the processes in their production frequently require more exposure to heat. Similarly, such exposure very often includes contacts with corrosive substances such as alkalies, acids and solvents. Solutions to such problems have been sought by the introduction into plastics of inorganic salts or metallic soaps or bromine containing compounds as can be seen in such recent patents as U.S. Pat. Nos. 3,819,577; 3,821,141; and 3,826,777. Hithertofore, no one, despite the wide use in industry of combinations of inorganic fillers and organic polymers, has supplied a combination that has the unique combination of an exceptionally low flame spread index with good strengths and chemical and other resistances.

An object of this invention is to provide such chemical compositions. An additional aim of this invention is the provision of inorganic mixtures which may be readily incorporated into organic polymeric substances which then may be shaped into articles which have, by virtue of said mixtures, great resistivity to combustion, heat, solvents, and corrosive substances. These and other purposes will appear hereinafter.

BRIEF DESCRIPTION OF THE INVENTION

The goals of this invention are accomplished by the provision of mixtures of a highly hydrated inorganic salt and a hydraulic cement. These materials are here exemplified by $Al_2(SO_4)_3 \cdot 18 H_2O$, $Al_2(SO_4)_3 \cdot 14H_2O$, $FeSO_4 \cdot 7H_2O$, and Portland cement. The aluminum sulfate and the ferrous sulfate hydrates are preferred because they liquefy at relatively high temperatures (approximately 450° F. and 350° F., respectively) and because they retain the water until temperatures above about 800° F. are reached. Further, upon release of the water, the salts liquefy and then solids are formed which are fire resistant. Along with the release of water is the reaction between it and the cement, and this reaction enhances the production of protective caked materials that are also fire-retardants. Preferred in the mixtures is a ceramic fiber which resists melting at temperatures about 3000° F. Such a material is fibrous alumina silica; and while it may be ground or micronized, it is generally preferred that it be used in its natural fibrous state since the ultimate tensile strengths are generally higher. Certain metallic oxides are incorporated in the mixtures, as for example, $Fe_2O_3$ and $MnO$ which reduce smoke and odor, among other advantages. When the organic polymeric material is an epoxy resin, it is necessary to incorporate graphite in order to obtain the best hard, protective, fire-resistant shields.

DESCRIPTION OF THE PREFERRED EMBODIMENTS

In a preferred embodiment $Al_2(SO_4)_3 \cdot 18H_2O$ is chosen as the inorganic salt hydrate because of its very high free energy and its heat of formation (2, 120 K. cal/mole), since this means that very substantial energy is required to remove the water of hydration. Temperatures of the order of 800° F. or above are required. Further, it releases said water slowly. Salts with decreasing amounts of crystallinic water will exhibit increased melting points. Upon release of one molecule of water the salt solidifies and cakes up. This phenomenon continues with increased resistance to the release of additional water. With the effective slow release of water by means of this invention, very little water is lost to the atmosphere even at said high temperatures. Admixed with the preferred aluminum sulfate hydrate is a hydraulic cement, preferably Portland cement though calcium aluminate cement may also be used. The cement acts as a moisture stabilizer picking up the water released from the hydrate and converting the mass to a concrete. While the powdered mixture of hydrate and cement may be marketed as such and may be applied as a coating to substrates to provide fire-retardancy, it is preferred to admix the materials uniformly in the substance from which the shaped article is to be formed.

In such practice, a polyester resin such as a resin derived from Bisphenol-A, $HOC_6H_4C(CH_3)_2C_6H_4OH$, commercially obtainable in liquid form, is admixed with the inorganic powder, which preferably also contains alumina silica, in the presence of such promoters or catalysts as are needed, until a uniform distribution of the inorganics in the organic polymer results. This is accomplished by conventional techniques prior to the setting time of the resin, and the uniform mix is then coated on a substrate or placed into the desired mold and the setting occurs in the shape desired. Such shapes may be valves, pipes, boats, linings, and the like.

Such procedures as the above and the purposes of this invention are further detailed in the following examples which are given for illustrative purposes and are not limitative and in which parts and percentages are by weight unless otherwise indicated.

EXAMPLE I

A coating of an aluminum sulfate hydrate, specially $Al_2(SO_4)_3 \cdot 14H_2O$, is adhered to a substrate, such as a sheet made from an alkyd resin or on a metal sheet, and when in dry form it is exposed to a flame. The flame is at about 2800° F. and is held for 8 minutes from about 0.5 inch to about 2 inches above the coating's top surface. From 3 to 5 seconds after removing the flame, no flame issues from the surface. While there is little or no smoke or odor, the coating had internal flaws, had some cratering, and did not have satisfactory gelling or setting characteristics. Thus, while fire-resistance is attained, it is preferred to incorporate the fire-retardant materials directly into the material to be protected, not only because cracking is prevented or minimized, but because the polymeric material frequently on flaming gives off chemicals which extinguish the flame.

A series of experiments were conducted following the procedures described above using a commercially available polyester into which were uniformly mixed various fire-resistant materials. The polyester used was "Atlac" 711-05-A obtainable from ICI of America, Inc., and the resin was uniformly mixed with 43% by weight of the mixtures of the fire-resistant fillers listed in Table I, the parts there showing the amounts of each used in making up the mixture.

In the flaming test, thwe torch is applied to the article containing the subject additives for two minutes and then is removed. The time that the flame lasts on the article is then measured and is given as the time at the start. The torch is then applied and removed a number of times, the total time being given as the torching time.

At the end of the torching time, the flame duration is again measured, being designated as the flame duration at the finish. The greater the total time of torching the greater is the stability of the article being treated.

In Table I the samples used were cylinders being 2¼ inches in diameter by 5 inches (approximately) in length.

mixes of the hydrate and Portland cement offer color addition. Also, the hydrate/cement/ferric oxide/manganous oxide/alumina silica mixtures afford useful compositions, and any of the said mixtures, liquid or powder, can be readily mixed with commercially available polymeric bases, such as polyesters and epoxy resins, and cast into the desired shapes.

TABLE I*

| Ingredients (Parts)** | Time of Torching in Minutes*** | Flame Duration After Torch Removal in Seconds Start Finish | Depth | Crater Cracks | Development Porosity | Amount of Smoke | Odor | Curing Speed |
|---|---|---|---|---|---|---|---|---|
| 1. A (400) | 8 | 3 to 5 | >2 | Internal Flaws | O | L to M | L to M | Slow |
| 2. A (400) P (40) | 15 | 1.5 to 2 | 1.75 | L | O | L | L | Good |
| 3. A (400) P (150) | 8 | 6 to 11 | 1–1.75 | L | H | L to M | L | Slow |
| 4. A (400) P (40) F (4) | 15 | 4 to 2 | 0.75 | V L | O | V L | L | Good |
| 5. A (400) P (80) F (16) | 10 | 3 to 2 | 1.0 | V L | O | V L | L | Good |
| 6. A (400) P (40) F (4) M (20) | 18 | 2 to 4 | 1.0 | 0 | 0 | V L | L | Good |
| 7. A (400) P (40) F (4) M (100) | 15 | 2 to 5 | 1.25 | O | M | L | L | Good |
| 8. A (400) P (40) F (4) K (10) | 10 | 6 to 8 | 1 | V L | H | L | L | Fast |
| 9. A (400) P (40) F (4) M (20) K (30) | 20 | 3.5 | 0.5 | V V L | O | V L | L | V Good |
| 10. A (400) C (150) F (10) | 10 | 5–6 | 1.4 | O | H | L | L | Slow |

*A = $Al_2(SO_4)_3 \cdot 14H_2O$
P = Portland Cement
C = Alcoa high alumina calcium cement
F = $Fe_2O_3$
Mn = MnO
K = Alumina Silica (½–1 in. fibers)
D = Dawsonite
L = Low, Vl = Very low
M = Medium
H = High
**475 parts of resin were used with the indicated parts of the additives.
***Torch is 1 inch above sample. Effective temperature is 2800° F.

From the above results on Table I, it can be seen that the mixture of Portland cement and the aluminum sulfate hydrate is better than the hydrate alone. Additionally, one may mix pigments with the cement to afford color effects in the shaped products. The addition of ferric oxide to the hydrate/cement mixture results in further improvements; and the addition of manganous oxide eliminates cracking. However, too high a level of manganous oxide leads to increased porosity. Similarly, the use of too much Portland cement results in longer flame retention and increased porosity. Also, the use of ferric oxide advantageously reduces flame support and lessens porosity and causes faster gelling. Further, it can be seen that Portland cement produces better results than high calcium alumina high temperature refractory cement. In other experiments high level amounts (60% and 70%) of the fire-retardant mixtures of this invention gave workable cast products.

Powder mixes of the aluminum sulfate hydrate, Portland cement, ferric oxide and manganous oxide afford useful mixes for fire-retardancy while powder In a still further experiment, a coarse aluminum sulfate hydrate was used with Portland cement and with alumina silica but with the ferric oxide and manganous oxide omitted. While the shaped article was apparently in as good condition as was the $Fe_2O_3$/MnO containing material, there appeared to be some cracking and a bit more smoke and smell on application of the torch. Thus, products containing $Fe_2O_3$/MnO as well are preferred.

EXAMPLE II

The procedures used in Example I were followed but instead of uniformly mixing in the 43% by weight of any of the fire-resistant materials used in this invention, that amount of a commercially available fire or smoke retardant material was used. They were as follows: "KRONITEX" 100 is obtainable from the FMC Company and it is a liquid, chemically being triisopropylphenyl phosphate; DOX, obtainable from, the White Chemical Co., is decarbromodiphenyl oxide containing about 29% bromine and about 40% chlorine. It melts at 392° F. and has a high decomposition temperature (500° F.); C331 is a powdered aluminum hydrate, $Al(OH)_3$, obtainable from Alcoa and used as a plastic filler having flame retardant and smoke suppressing properties; and Dawsonite is a hydrated sodium aluminum carbonate obtainable from Alcoa in a fiber-like form and is used as a reinforcing agent and fire-retardant.

TABLE II

| Ingredients (Parts) | Time of Torching in Minutes | Flame Duration After Torch Removal in Seconds Start Finish | Depth | Crater Cracks | Development Porosity | Amount of Smoke | Amount of Odor | Curing Speed |
|---|---|---|---|---|---|---|---|---|
| 1. "KRONITEX" 100 (57) | 10 | 5 to 15 | 1.25 | M | H | H | M | Slow |
| 2. DOX (57) | 15 | 3.5 to 14 | 1.25 | L M | H | V H | H | Slow |
| 3. C331 (57) | 10 | 6 to 18 | 1.5 | H split | O | L | L | Slow |
| 4. Dawsonite (21) | 15 | 8 to 32 | 0.5 | One, deep | O | L | M to L | Good |

In the above experiment with FMC the shaped polymeric composition deteriorated becoming soft and giving off heavy smoke and odors. The result in experiment 2 above was much the same with very heavy smoke being emitted. In experiment 3, while deterioration occurred along with bad cracking, the C331 acted as a good smoke depressant. Difficulty was encountered in using Dawsonite, for it was hard to mix with the polymer and use of 21% of it, by weight, led to pasty compositions. Further, deterioration occurred with high flame support, and much odor.

None of the experiments using commercially available retardants led to the excellent results obtained by application of the principles of this invention.

EXAMPLE III

This experiment demonstrates that commercially available fire retardants can be used with compositions of this invention.

To 500 ml. of the polyester used in Example I was added a mixture comprising 400 parts of $Al_2(SO_4)_3 \cdot 14H_2O$; 40 parts of Portland cement; 4 parts of $Fe_2O_3$, 20 parts of MnO and 20 parts of Dawsonite, enough of said mixture being used to produce a resultant mix containing 43% by weight of said mixture and 57% by weight of said polyester. Upon flaming the shaped article produced from the mix for 10 minutes at 2800° F. (0.5-2 inches above the exposed surface) and then withdrawing the torch, the flame support by the heated flamed article lasted only 4 to 5 seconds. The depth of craters was about 0.75 inch with very little cracking and no production of porosity. Smoke and odor were low and gelling time was satisfactory. Increasing the amount of Dawsonite to 40 parts led to difficulty in mixing and to increased flame support, smoke and odors.

Thus, while such materials can be added to the compositions of this invention, no significant advantage attends such use.

EXAMPLE IV

A large batch of Atlac 711-05-A resin, a polyester, was mixed with the fire-retardant mixture used in Experiment 9 of Table I; $Al_2(SO_4)_3 \cdot 14H_2O$ (400), Portland cement (40), $Fe_2O_3$ (4), MnO (20), and alumina silica (30) to produce a 57/43 polymer/filler mix to which was added a small amount of "LUBERSOL DDM," 60% solution of methyl ethyl ketone peroxide in dimethyl phthalate. Mixing and remixing (if settling occurred) was easily effected, and the material had a long pot life, affording molding as desired. After 4 days at room temperature, the catalyzed mixture was visually fully cured. The large slabs (6 × 18 inches × ¼ inch) or blocks (2 feet × 2 inches × 2 inches) or small sections (¾ diameter by 2 inches long) could readily be made and handled and cut with conventional tools into desired shapes.

These products were designated as "Compound A-6".

Similar shaped articles were produced using an epoxy resin ("EPON" 828) inducing polymerization in the conventional way with diethylene triamine as the catalyst. A significant exotherm occurred on mixing in the catalyst, but the pot life was adequate to effect molding. In fact, the catalyzed mixture still had some pliability after 4 days at room temperature so that a post cure at 100° C. for 2 hours was effected. More rapid curing can, of course, be effected using other catalysts or by encouraging the exotherm, for example. Again, the shaped articles could easily be cut.

These were designated "Compound E".

The two were then tested extensively, the results being given in TABLE III below.

TABLE III

| Test and Conditions | Performance of Compound A-6 | Performance of Compound E |
|---|---|---|
| Chemical Exposure, 16 Hrs., Boiling Solutions of: | Weight loss or gain: | Weight loss or gain: |
| 50% KOH | +12.1% | +0.1% |
| 50% $H_2SO_4$ | +7.8% | +0.2% |
| Xylene | −37.0% | −9.2% |
| Heptane | +19.2% | −6.0% |
| Methyl Ethyl Ketone | −32.9% | −12.0% |
| Trichloroethylene | −19.9% | −3.4% |
| Water Absorption, 2 Hrs., at Boiling | + 3% | + 0.5% |
| Salt Water Exposure, 200 Hrs., at Room Temperature - 5% Solution | Surface bleaching, no penetration | Surface bleaching and chalking; |

TABLE III-continued

| Test and Conditions | Performance of Compound A-6 | Performance of Compound E |
|---|---|---|
| of Sodium Chloride | into core | abrasion resistance reduced, no penetration into core |
| Simulated Weathering Exposure (ASTM G-25), 200 Hrs. | Surface bleaching | Surface bleaching and chalking |
| 150 PSI Steam, 1.5 Hrs. | Surface bleaching | Surface bleaching and chalking |
| Physical Properties: | | |
| Density (ASTM D-792) | 1.4 g/ml | 1.5 g/ml |
| Hardness (ASTM D-785 & D-2240) | <Rockwell B, Shore A 96 | <Rockwell B, Shore A 90 |
| Shear (ASTM D-732) | 1800 psi, $\infty$ modulus | 3080 psi, $\infty$ modulus |
| Tensile (ASTM D-638) | 1030 psiat RT, 515 psi after 7 days at 300° F., $\infty$ modulus, both cases | 1550 psiat RT, 1090 psi after 7 days at 300° F., $\infty$ modulus, both cases |
| Compressive Strength (ASTM D-395) | 6300 psi at RT, 3800 psi after 7 days at 300° F | 10050 psiat RT, 4550 psi after 7 days at 300° F. |
| Electroconductivity (ASTM D-257) | $3 \times 10^5 \Omega$ | $1.55 \times 10^{14} \Omega$ |
| Thermal Conductivity (ASTM C-177) | 2.04 cal/sec/cm$^2$/° C/cm | 0.57 cal/sec/cm$^2$/° C/cm |
| Gas Permeability | 3.9 cc/hr/in | $8 \times 10^{-3}$ cc/hr/in |
| Coefficient of Expansion, 3 days 200° F., (ASTM D-696) | 0 | 0 |
| Brittleness Point | −40° F. | −40° F. |
| Softening Point/Auto Ignition Temperature (Muffle Furnace) | Does not soften, at 195° F., strong odor emanates; charring begins at 320° F., bubbling at 375° F., no further change until 812° F., when sample developed incadescence, sample did not autoignite at up to 950° F. | Does not soften, at 195° F. strong odor emanates, crackling, popping and bubble formation at 258° F., charring at 473° F.; no further change until 812° F., when sample developed incadescence. No autoignition at up to 950° F. |
| Flammability (Radiant Panel - ASTM E-162) | Flame spread index = 34 | Flame spread index = 6 |

Both compounds had minimal thermal expansivity at 200° F. and remained flexible at low temperatures as measured by a brittleness test. Most outstanding were their low flammabilities as measured by the radiant panel, that of Compound E being quite low.

EXAMPLE V

This example relates to the use of graphite as an ingredient of the fire-retardant mixtures of this invention.

A polyester resin, such as "Atlac" 71105A (57 parts) is stirred while mixing (43 parts of the inorganic additive mixture) therein alumina silica, graphite, FeSO$_4$ . 7H$_2$O, Al$_2$(SO$_4$)$_3$ . 18H$_2$O), Portland cement, in different combinations and amounts as shown in Table IV below.

An epoxy resin ("EPON" 828) was treated similarly.

The shaped articles (0.5 in. × 0.5 in. × 1 inch) were uniformly flamed, the results being indicated below.

TABLE IV

| Polyester | Burning Time (Seconds) | Amount of Destruction |
|---|---|---|
| 1. Polymer (D) only | 12 | One-fourth was destroyed. Remainder fragile and hard. Completely gone in 3 minutes. |
| 2. D + Alumina Silica (3) | 0 | Retained shape and hardness. No color change. Weight loss of 7%. |
| 3. D + FeSO$_4$ . 7H$_2$O (25) | 0.5 | Destroyed |
| 4. D + Alumina Silica (3) FeSO$_4$ . 7H$_2$O (45) Graphite (3) | 0 | Medium color change. Shape retained. Graphite surface to ⅛ inch. No weight loss. |

Addition of graphite to System No. 2 leads to improvements as in System No. 4.

| Polyether | Burning Time (Seconds) | Amount of Destruction |
|---|---|---|
| 5. Polymer (A) only | 99 | About ¼ destroyed; remainder fragile. |
| 6. A + Alumina Silica (3) Al$_2$(SO$_4$)$_3$ . 18H$_2$O (25) Portland Cement (25) | 10 | No color change. Shape and hardness retained. Weight loss of about 13%. |
| 7. A + Alumina Silica (5) FeSO$_4$ . 7H$_2$O (25) Portland Cement (25) Graphite (3) | 51 | Medium discoloration. Graphite surface to ⅛ inch. Balance satisfactory. Weight loss of about 18%. |
| 8. A + Alumina Silica (10) FeSO$_4$ . 7H$_2$O (25) Portland Cement (15) Graphite (5) | 54 | No color change. Shape and hardness satisfactory. Graphite surface to 1/32 inch. Weight loss of about 20%. |

In testing the above systems for resistance to H$_2$SO$_4$, HCl and HNO$_3$, it was found that the products containing ferrous sulfate hydrate and graphite showed only light discoloration with only very slight surface porosity being produced, these products exhibiting superior resistance over products not containing graphite and over products containing alum as the hydrate.

In the conventional candle test samples 1/8 in. × ½ in. × 3 inches were used, the torch being at 1000° F. System No. 1 (the polyester alone) supported combustion after ignition for 12 seconds while Systems Nos. 2 and 4 did not support combustion at all in said test. As to the epoxy products, the polymer alone (system 5 in Table IV) supported combustion after removal of the torch for 99 seconds, whereas System Nos. 7 and 8 supported combustion only for 54 and 51 seconds, respectively. In the same test the epoxy polymer ("EPON" 828) similarly filled with a mixture made up of 3 parts of alumina silica, 25 parts of alum and 25 parts of Portland cement supported combustion for only 10 seconds.

EXAMPLE VI

System No. 6 in Table I above was rerun with 20 parts of antimony oxide (Sb$_2$O$_3$) added to the mixture of the fire retardants. A further improvement was obtained in that the shaped article did not support the flame at all. Again, there was little or no smoke and odor. Thus, the use of antimony oxide is beneficial and the addition of it in amounts of about 2% to about 5%, based on the total weight of the mixture, is frequently effected.

The compounding processes used in this invention are effected readily. If alumina silica is being used, it is preferred to mix that material in first especially if long fibers are being used. It is the most difficult of the various inorganic substances used to get uniformly mixed with the polymer. However, if a promoter, such as cobalt naphthenate, is being used with a polyester, for example, it can be and usually is added first. After the alumina silica is uniformly mixed, the hydrate(s) can be added followed by the cement(s) and the oxides. The same procedure is followed when using an epoxy and other resins. The graphite fibers, which can be used with any of the polymers and is essential for the epoxy polymers, is mixed in last when an epoxy is used.

The aluminum sulfate hydrate, commonly known as alum, is obtainable commercially in powder form. While it may be designated as $Al_2(SO_4)_3 \cdot nH_2O$, the usual hydration is to the extent of 18 molecules of water. The commercial form is dehydrated somewhat, generally having about $14H_2O$ per sulfate molecule. The slight dehydrated form is preferred over the full hydrated form, since better control results during the curing and the article retains its shape a bit better after curing. One may also use ferrous sulfate ($FeSO_4 \cdot 7H_2O$), but alum is preferred since it affords better curing and heat resistance and is a very good smoke and odor supressant. While there are many inorganic hydrates, alum and ferrous sulfate hydrate are preferred because they lead to the formation of hard caked material on the surfaces exposed to high temperatures. Also, the preferred hydrates are the ones that retain their water of hydration up to temperatures of about 800° F. in the compositions of this invention. As a class, those hydrates that retain the hydrate at temperatures of 150° C. (302° F.) or, even better, 250° C. (482° F.). The use of ferrous sulfate hydrates results in substantial improvement in corrosion resistance; that is, the filled products have much increased resistances to the corrosive action of hydrochloric, nitric, or sulfuric acids.

The hydrate may be added in granular form, finely powdered or coarse grained, or as slurries, as, for example, as are available from pickling steps in the iron industry and contain upwards of 90% by weight of the hydrated ferrous sulfate. Similarly, hydrated aluminum sulfate in the form of slurries from the aluminum industry are usable. The water in the slurry is advantageously used by appropriate amounts of the cement ingredient. Of the cements, Portland cement is preferred; though tricalcium aluminate is satisfactory. If water is being added to the polymer, as by the slurry route, for example, an amount of cement minimally is required to combine with the free water in the slurry used along with the amount that is to be present to tie up the water released from the hydrate in any heat exposure that effects the release. The cement, especially the Portland, acts as a curing catalyst, especially for the epoxy polymers, and the cements reduce weight loss upon exposure of the articles to flame. It is preferred that about 99% of the Portland cement be under 400 mesh, because this eases the mixing. With the cement in that form, further grinding down to a range of 25 microns can easily be effected. Generally, the finer the mesh, the better the ultimate results. The cements are readily available, and any of those meeting ASTM Standard Specifications can be used.

A cement, such as Portland, contains sulfur and it, on flaming the cement, is usually emitted as sulfur trioxide. The sulfate hydrates also will emit sulfur compounds on extensive flaming. The ferric oxide and/or manganous oxide present tie-up the trioxide and similar sulfur by-products, cutting down odor and smoke. The ferric oxide can be used in the form of the red, commercially available $F_2O_3$, or one may use the trihydroxide, $Fe(OH)_3$, a yellow material which converts on heating to the oxide. Advantageously, the iron oxide also allows one to introduce a pigment into the compositions. As mentioned above, it improves curing, assists in the dispersion of all the particles in the mixing steps as well as forming complex iron alumina sulfur hydrates which are refractories and help retard flame impact and weight loss. No other oxides having the above advantages coupled with cheapness and availability are known. While ferrous oxide is operable, it is considerably more expensive than the ferric.

The manganous oxide, while it can be used without ferric oxide and vice versa, is preferably used with it. Stress cracking on heating is reduced, strengths are improved, and it, like ferric oxide, reduces the amount of smoke and odor.

The alumina silica component may be added in granular or in fiber form. It is typically 55% $Al_2O_3$ and 45% $SiO_2$, a specific one being 51.7% $Al_2O_3$ and 47.6 $SiO_2$. These oxides may be added separately, if desired. Generally, the alumina silica is commercially available in solid form as washed or chopped fibers having lengths of about 0.25 to about 1 inch; though lengths up to 2 inches are operable and commercially available. If chopped, the lengths are about 1/16 to about ¼ inch with dust fibers (1/64–1/16 inch) being present. Fiber diameters are 2 to 3 microns. Also, the fibers may be ground or micronized. Whatever the form, the material improves physical strengths, fire resistance, and weight loss on exposure of the articles containing it to flame. The longer fibers usually afford the greatest in said improvements and are preferred, since they appear to form an insulating blanket upon flaming. The material is capable of withstanding continuous heat at 2300° F. and does not melt until heated to 3260° F. Thus, the alumina silica is far superior to conventional materials such as glass fibers, glass spheres, asbestos, potassium titanate fibers, among others. It affords better adhesion, acts favorably in improving structural strength acting as a matrix binder, and assists in preventing the escape of water from the hydrate, thus adding a cooling effect. The slow escape of water allows slow carbonization and salt caking so that a very durable salt cake forms. If the hydrates convert to liquids and rapidly or explosively give off their water of hydration, the desired caking effect is lost. With the alumina silica in fiber form, a sponge effect is attained and that structure functions as a filter that controls or prevents the water emission from the heated, shaped article. While other ceramic fibers exist, none is as effective as the alumina silica.

As mentioned above, when epoxy polymers are being processed, graphite is used preferably in fiber form. The length thereof is generally up to about 0.5 inch. The graphite is important in aiding substantially the completeness of the cure as well as improving the physical properties of the epoxy shaped article, but most importantly it promotes most effectively and essentially the resistance to flame since a very hard, protective shield is formed in the carbonization that occurs on flame impact. For such reasons, the epoxy polymers within this invention make better internal linings for conduits or tanks or the like than do the polyesters, and additionally, they adhere better to the walls of the containers than do the polyesters.

From the above, it is apparent that synergistic effects are obtained through the use of the combinations of the inorganic materials described above, with or without graphite. One skilled in the art will readily recognize that the amounts of a particular ingredient in the compositions of this invention can be varied within certain limits while varying the amounts of other ingredients. With that in mind, the compositions may contain up to about 80% of the hydrate, up to about 40% of the cement, up to about 20% of the iron oxide, up to about 20% of the manganese oxide, and up to about 10% of the graphite, said percentages being based on the weight of the total mixture. Generally, from about 5% to about 70% of the hydrate is used with amounts of about 25% to about 60% being preferred. As to the cement, these ranges are from about 10% to about 30% with about 2% to about 10% being preferred. The iron oxide ranges are about 0.5% to about 5.0%. Those of the manganese oxide are about 1.0% to about 10.0%, while those of the alumina silica are about 2% to about 10%. As to graphite, these amounts are about 1% to about 5% with about 3% to about 5% being preferred. The weights above are based on the total weight of the mixtures.

While the fire-retardant mixtures of this invention may be beneficially incorporated into many materials, the polyesters and epoxy resins are preferred. Of the esters, the "ATLAC" products, such as 711, specifically 711-05-A, and 382, obtainable from ICI of America; and of the epoxy resins "EPON" 828 of the Shell Chemical Company have been mainly used herein. The polyesters are generally preferred to be the unsaturated ones or to have present polymerizable unsaturated monomers such as styrene. Such may be selected from such U.S. Patents as Nos. 2,607,756; 2,705,836; 2,743,309; 2,819,248; 2,851,379; 3,018,267; 3,129,110; 3,217,066; 3,222,421; 3,227,665; 3,232,893; 3,331,796; and 3,551,378, among others. Those of Hooker Chemical Co. identified as "HETRON" brand polyesters, the "DERAKANE 510-40" brand polyesters of Dow Chemical Co. as well as polyesters from the Celanese, American Cyanamid, and Rohm & Haas Corporations may be used.

If unsaturation is present in the polyester, conventional promoters such as cobalt naphthenate and conventional catalysts, such as methyl ethyl ketone peroxide, are added. The promoter is usually in liquid form as a 6% solution and amounts up to about 4% of the total weight of the mixture being used. The solvent is usually an organic, volatile material and may be a polymerizable material, such as styrene. Usually, the solvent for the promoter and catalyst is dimethyl phthalate. Similarly, the peroxide, be it methyl ethyl ketone peroxide or benzoyl peroxide or any other similar compounds is readily blended in, generally, in amounts up to about 2.0% based on the total weight of the mixture. The polyester/vinyl monomer ratio is usually between 1/10 and 10/1 by weight.

The preferred epoxy resins are those prepared from bisphenols such as Bisphenol "A" and an epihalohydrin such as epichlorohydrin. The epoxy material may be selected from such polymers mentioned in Brenner et al *High-Temperature Plastics.* *
*Reinhold Publishing Corporation (1962)

Saturated polymers may be employed as, for example, alkyd resins, the polyesters made from polyhydric alcohols and polycarboxylic acids or anhydrides; polymers and copolymers of ethylene terephthalate, as, for example, poly(ethyleneterephthalate); polyamides from diamines such as hexamethylene diamine and adipic acid or from other polyamide forming ingredients, such as e-caprolactam; polyimides; polyhydrocarbons, as, for example, polyethylene and polypropylene; polyurethanes, as, for example, those made from toluene diisocyanate and polyhydric materials as glycols and alkoxylated pentaerythritol or sorbitol; polyhalo polymers, as for example, polyvinyl chloride, polyvinyl fluoride or poly(tetrafluoroethylene) or copolymers of tetrafluoroethylene; the polyacrylics, among many others. Of the many polymers that can be beneficially modified by use of the retardant mixtures of this invention, the thermosetting resins are preferred.

Since there are many unsaturated monomers that are inexpensive, it is frequently desirable to use them in conjunction with other polymers, as the above mentioned unsaturated polyesters, effecting copolymerization. Such monomers are found in U.S. Pat. Nos. 2,443,735; 2,407,479; 2,491,404; 2,931,784 and 3,210,441 and include the vinyl monomers such as vinyl acetate, vinyl chloride, and acrylonitrile, as well as the allyl monomers exemplified by allyl acetate and diallyl phthalate; the acids, as, for example, acrylic and maleic acid and methacrylic acid; aromatic monomers, such as styrene, divinyl benzene, and vinyl pyridine and esters as methyl acrylate, methyl methacrylate and diethyl fumarate. While such monomers can constitute up to 90% by weight of the shaped article usually amounts from about 30% to about 70% by weight are used, it being preferred to have present a performed polyester or epoxy resin in the curable composition.

In the absence of the fire-retardant mixtures, the above-named polymers on exposure to flame burn quite readily. The prior art procedures of incorporating halogen-containing materials or phosphates or an additive such as antimony trioxide do not afford adequate protection. Such, however, is attained by the use of the compositions of this invention. Not only are the ultimate products most difficult to combust, they are self-extinguishing. Further, they possess good thermal conductivity and can be shaped by ordinary machine techniques or can be molded during the time they are being cured. Curing is preferably carried out at room temperature, though temperatures of between $-20°$ F. and 300° F. may be used. Amines such as dimethylaniline, dimethyl amine, or diethylenetriamine, may also be used as catalysts. The resultant cured, filled polymers have good resistance to solvents, to corrosive materials such as acids and bases and possess the strength and related properties of the unfilled polymers usually to a higher degree.

The filled polymers are useful in making valves, fittings, pipes, pump parts, linings for vehicles as trucks, construction elements for homes, offices, or other buildings, boats, and other vehicles, among many other uses.

While the invention has been disclosed herein in connection with certain embodiments and certain structural and procedural details, it is clear that changes, modifications, or equivalents can be used by those skilled in the art; accordingly, such changes within the principles of the invention are intended to be included within the scope of the claims below.

What is claimed is:

1. As a new composition of matter, a mixture of fire-resistant materials which mixture comprises a hydraulic cement and an inorganic salt hydrate selected from the group consisting of aluminum sulfate hydrate and ferrous sulfate hydrate and which mixture has been uniformly distributed in a synthetic, organic polymer and which mixture comprises from about 5% to about 80% by weight of said hydrated salt, from about 1% to about 10% by weight of a hydraulic cement, and about 1% to about 10% of aluminum silica, said percentages being based upon the total weight of said mixture.

2. A composition in accordance with claim 1 in which said hydrated salt comprises an aluminum sulfate hydrate.

3. A composition in accordance with claim 1 in which said hydraulic cement comprises Portland cement.

4. A composition in accordance with claim 1 in which said hydrated salt comprises from about 25% to about 60% by weight of a hydrated aluminum sulfate, said hydraulic cement comprises from about 2% to about 10% by weight of Portland cement and said alumina silica is present in amounts of from about 3% to about 10% by weight, said weights being based on the total weight of said mixture.

5. A composition in accordance with claim 4 which also comprises an iron oxide and a manganese oxide.

6. A composition in accordance with claim 1 in which said alumina silica is in fibrous form.

7. A composition in accordance with claim 6 in which said fibrous alumina silica have fibers in it that have lengths of about 0.25 inch to about 2.0 inch.

8. A composition in accordance with claim 1 in which said alumina silica is in powder form.

9. As a new composition of matter, a mixture of fire-resistant materials comprising a hydraulic cement and an inorganic salt hydrate selected from the group consisting of aluminum sulfate hydrate and ferrous sulfate hydrate, said cement being present in amounts from about 1% to about 40% by weight and said hydrate being present from about 5% up to about 80% by weight, said percentages being based on the total weight of said mixture, said mixture of said fire-resistant materials being uniformly distributed in a synthetic, organic polymer, and said polymer being thermosetting.

10. As a new composition of matter, a mixture of fire-resistant materials comprising a hydraulic cement and an inorganic salt hydrate selected from the group consisting of aluminum sulfate hydrate and ferrous sulfate hydrate, said cement being present in amounts from about 1% to about 40% by weight and said hydrate being present from about 5% up to about 80% by weight, said percentages being based on the total weight of said mixture said mixture of said fire-resistant materials being uniformly distributed in a synthetic, organic polymer, said composition being in liquid form, and includes a thinner.

11. A composition in accordance with claim 10 in which said thinner is a polymerizable monomer.

12. A composition in accordance with claim 10 in which said thinner is styrene.

13. As a new composition of matter, a mixture of fire-resistant materials comprising a hydraulic cement and an inorganic salt hydrate selected from the group consisting of aluminum sulfate hydrate and ferrous sulfate hydrate, said cement being present in amounts from about 1% to about 40% by weight and said hydrate being present from about 5% to about 80% by weight, said percentages being based on the total weight of said mixture and said mixture being uniformly distributed in a synthetic polymer which is selected from the group consisting of polyesters and epoxy polymers.

14. A composition in accordance with claim 13 in which said mixture includes alumina silica.

15. A composition in accordance with claim 14 in which said alumina silica is fibrous and has fibers in it having lengths of about 0.25 to about 2.0 inch.

16. A composition in accordance with claim 14 in which said alumina silica is in powder form.

17. A composition in accordance with claim 13 which includes an iron dioxide.

18. A composition in accordance with claim 13 which includes a manganese oxide.

19. A composition in accordance with claim 13 in which said salt hydrate is an aluminum salt hydrate.

20. As a new composition of matter, a mixture of fire-resistant materials which mixture comprises a hydraulic cement and an inorganic salt hydrate selected from the group consisting of aluminum sulfate hydrate and ferrous sulfate hydrate and said mixture has been distributed uniformly in a synthetic organic polymer which is selected from the group consisting of polyesters and epoxy polymers and which said mixture comprises from about 5% to about 70% by weight of said hydrated salt, from about 10% to about 30% by weight of said hydraulic cement, and about 1% to about 10% by weight of graphite, said percentages being based on the total weight of said mixture and said graphite being in fibrous form, the fibers of which are from about 0.25 to about 0.5 inch in length.

* * * * *

UNITED STATES PATENT OFFICE
CERTIFICATE OF CORRECTION

Patent No. 4,122,059          Dated October 24, 1978

Inventor(s) Lars J. Hansen

It is certified that error appears in the above-identified patent and that said Letters Patent are hereby corrected as shown below:

In the section [73] Assignee, "World Chemical Industry, Inc." should read ---World Chemical Industries, Inc.

Signed and Sealed this

Eleventh Day of September 1979

[SEAL]

*Attest:*

*Attesting Officer*       LUTRELLE F. PARKER
*Acting Commissioner of Patents and Trademarks*